United States Patent
Lindoff et al.

(10) Patent No.: US 9,137,075 B2
(45) Date of Patent: Sep. 15, 2015

(54) SUBCARRIER SPACING IDENTIFICATION

(75) Inventors: Bengt Lindoff, Bjärred (SE); Robert Baldemair, Solna (SE); Erik Dahlman, Bromma (SE); Stefan Parkvall, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 2352 days.

(21) Appl. No.: 11/943,440

(22) Filed: Nov. 20, 2007

(65) Prior Publication Data

US 2008/0205351 A1    Aug. 28, 2008

Related U.S. Application Data

(60) Provisional application No. 60/891,265, filed on Feb. 23, 2007.

(51) Int. Cl.
*H04J 11/00*       (2006.01)
*H04L 7/00*        (2006.01)
(Continued)

(52) U.S. Cl.
CPC ........ *H04L 27/2613* (2013.01); *H04L 27/0008* (2013.01); *H04L 27/0012* (2013.01); *H04L 27/2626* (2013.01); *H04L 27/2666* (2013.01); *H04L 27/2655* (2013.01)

(58) Field of Classification Search
CPC .......... H04J 2011/0009; H04J 2011/0096; H04L 7/04; H04L 7/041; H04L 7/042; H04L 27/0008; H04L 27/0012; H04L 27/2601; H04L 27/2602; H04L 27/2613; H04L 27/2621; H04L 27/2626; H04L 27/2627; H04L 27/2643; H04L 27/2655; H04L 27/2666
USPC ......... 370/203, 324, 350, 503, 206, 207, 330, 370/336, 343, 345, 436; 375/260, 362, 354, 375/357; 455/59, 60
See application file for complete search history.

(56) References Cited

U.S. PATENT DOCUMENTS 7,505,522 B1 *  3/2009  Larsson ................. 375/260
7,519,123 B1 *  4/2009  Larsson et al. ........ 375/260
(Continued)

FOREIGN PATENT DOCUMENTS

EP    0 901 256 A    3/1999
EP    1 538 802 A    6/2005
(Continued)

OTHER PUBLICATIONS

PCT International Search Report, dated Jul. 24, 2008, in connection with International Application No. PCT/EP2008/050939.
(Continued)

*Primary Examiner* — Alpus H Hsu
(74) *Attorney, Agent, or Firm* — Leffler Intellectual Property Law, PLLC; Kenneth B. Leffler

(57) ABSTRACT

A cellular communications system that utilizes OFDM in its radio interface is capable of utilizing either a first subcarrier spacing or a second subcarrier spacing. Which of these is presently in use is indicated by generating a first type of synchronization signal in response to the first subcarrier spacing presently being in use, and generating a second type of synchronization signal in response to the second subcarrier spacing presently being in use. Whichever of the first type of synchronization signal and the second type of synchronization signal was generated is transmitted. To distinguish between the first and second types of synchronization signals, a time domain representation of the second type of synchronization signal includes a plurality of instances of the first type of synchronization signal.

22 Claims, 12 Drawing Sheets

(51) Int. Cl.
*H04L 27/26* (2006.01)
*H04L 27/00* (2006.01)

(56) References Cited

U.S. PATENT DOCUMENTS

| | | | |
|---|---|---|---|
| 7,548,506 B2* | 6/2009 | Ma et al. | 370/208 |
| 7,567,502 B2* | 7/2009 | Laroia et al. | 370/208 |
| 7,911,935 B2* | 3/2011 | Akita et al. | 370/208 |
| 7,912,012 B2* | 3/2011 | Ma et al. | 370/332 |
| 7,969,858 B2* | 6/2011 | Laroia et al. | 370/208 |
| 7,983,143 B2* | 7/2011 | Akita et al. | 370/208 |
| 8,018,975 B2* | 9/2011 | Ma et al. | 370/509 |
| 8,085,814 B2* | 12/2011 | Ma et al. | 370/473 |
| 8,649,401 B2* | 2/2014 | Luo et al. | 370/514 |
| 8,804,478 B2* | 8/2014 | Han et al. | 370/210 |
| 2004/0190440 A1* | 9/2004 | Kim et al. | 370/210 |
| 2005/0207482 A1 | 9/2005 | Redfern | |
| 2006/0083159 A1* | 4/2006 | Laroia et al. | 370/208 |
| 2007/0041348 A1* | 2/2007 | Kwun et al. | 370/335 |
| 2007/0140106 A1* | 6/2007 | Tsai et al. | 370/208 |
| 2007/0195914 A1* | 8/2007 | Chang et al. | 375/343 |
| 2007/0298780 A1* | 12/2007 | Lindoff et al. | 455/423 |
| 2008/0095108 A1* | 4/2008 | Malladi et al. | 370/329 |
| 2008/0139237 A1* | 6/2008 | Papasakellariou | 455/522 |
| 2008/0267317 A1* | 10/2008 | Malladi | 375/299 |

FOREIGN PATENT DOCUMENTS

| | | |
|---|---|---|
| EP | 2122959 B1 | 5/2011 |
| WO | 2007/147853 A | 12/2007 |

OTHER PUBLICATIONS

PCT Written Opinion, dated Jul. 24, 2008, in connection with International Application No. PCT/EP2008/050939.

Mexican Office Action, dated Jun. 1, 2011, in connection with Mexican Patent Application No. MX/a/2009/008815.

Best available translation of Mexican Office Action, dated Jun. 1, 2011, in connection with Mexican Patent Application No. MX/a/2009/008815.

Russian Office Action, dated Dec. 27, 2011, in connection with Russian Counterpart Application No. 2009135390108.

Foreign Associate provided translation of Russian Office Action, dated Dec. 27, 2011, in connection with Russian Counterpart Application No. 2009135390/08.

Third Chinese Office Action, dated Feb. 5, 2013, in connection with counterpart Chinese Application No. 200880005724.8.

Translation of Third Chinese Office Action, dated Feb. 5, 2013, in connection with counterpart Chinese Application No. 200880005724.8.

Fourth Chinese Office Action, dated Nov. 15, 2013, in connection with counterpart Chinese Application No. 200880005724.8.

Translation of Fourth Chinese Office Action, dated Nov. 15, 2013, in connection with counterpart Chinese Application No. 200880005724.8.

* cited by examiner

SUBCARRIER SPACING IDENTIFICATION

CROSS REFERENCE TO RELATED APPLICATIONS

This application claims the benefit of U.S. Provisional Application No. 60/891,265, filed Feb. 23, 2007, which is hereby incorporated herein by reference in its entirety.

BACKGROUND

The invention relates to subcarrier spacing in mobile communication systems that employ Orthogonal Frequency Division Multiplexing (OFDM), and more particularly to techniques that enable a user equipment operating in such a system to detect which of a number of possible subcarrier spacings are presently being used for communications.

In the forthcoming evolution of the mobile cellular standards like the Global System for Mobile Communication (GSM) and Wideband Code Division Multiple Access (WCDMA), new transmission techniques like OFDM are likely to occur. Furthermore, in order to have a smooth migration from the existing cellular systems to the new high capacity high data rate system in existing radio spectrum, the new system has to be able to operate in a dynamically changeable bandwidth. A proposal for such a new flexible cellular system is 3G Long Term Evolution (3G LTE, where "3G" stands for "Third Generation") that can be seen as an evolution of the 3G WCDMA standard. OFDM will be used in this system in a technique called OFDM Multiple access ("OFDMA") to enable multiple users to share access to the radio spectrum in the downlink. The system will be able to operate on bandwidths ranging from 1.25 MHz to 20 MHz. Furthermore, data rates up to 100 Mb/s will be supported on the largest bandwidth.

Another important aspect of LTE is efficient support for broadcast and Multimedia Broadcast/Multicast Service ("MBMS"). In LTE, so called "Single Frequency Network" (SFN) operation is foreseen in which base stations are synchronized. Here, MBMS content is transmitted from several base stations using the same physical resources. The signals from these multiple transmissions are automatically "combined in the air", so no additional receiver resources are required for this purpose. In order for this "over the air combining" to work, all participating base stations must be synchronized—both in the frequency domain and in the time-domain—down to the extent of a fraction of the length of a cyclic prefix. In order to ease time synchronization requirements a long cyclic prefix is advantageous. However, increasing the cyclic prefix without increasing the OFDM symbol duration increases overhead and is thus not attractive. One possible solution is to use a smaller subcarrier spacing (and corresponding bandwidth), thus increasing the OFDM symbol duration (the OFDM symbol duration is inversely proportional to the subcarrier spacing). For example, halving the subcarrier spacing results in OFDM symbols that are twice as long, thereby enabling a cyclic prefix that is twice as long. In this manner, the amount of overhead is maintained constant. Therefore, in addition to support for 15 kHz subcarrier spacing, LTE also supports the use of a 7.5 kHz subcarrier spacing for SFN operation.

The physical layer of a 3G LTE system includes a generic radio frame having a duration of 10 ms. FIG. 1 illustrates one such frame 100. Each frame has 20 slots (numbered 0 through 19), each slot having a duration of 0.5 ms. A sub-frame is made up of two adjacent slots, and therefore has a duration of 1 ms.

One important aspect of LTE is the mobility function. Hence, synchronization symbols and cell search procedures are of major importance in order for the User Equipment (UE) to detect and synchronize with other cells. To facilitate cell search and synchronization procedures, defined signals include Primary and Secondary Synchronization Signals (P-SyS and S-SyS, respectively), which are transmitted on a Primary Synchronization Channel (P-SCH) and a Secondary Synchronization Channel (S-SCH), respectively. The P-SySs and S-SySs are each broadcast twice per frame: once in sub-frame 0, and again in sub-frame 5, as shown in FIG. 1.

The UE must detect, as soon as possible, whether it is connecting to a 7.5 kHz/subcarrier cell or a 15 kHz/subcarrier cell, since subsequent procedures may be different for the two cases. One possibility, of course, is to have two completely different synchronization signal designs, each uniquely associated with one of the subcarrier spacing sizes. However, here the UE would be required to have both synchronization signal designs implemented, in which case it would either have to run search algorithms for both synchronization signals in parallel—thus increasing complexity—or sequentially—thus increasing cell search time.

It is therefore desired to have a technique that will enable a UE to detect what the subcarrier spacing is without having to have two different synchronization signal designs.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in apparatuses and methods that indicate which of a first subcarrier spacing (e.g., 15 kHz) and a second subcarrier spacing (e.g., 7.5 kHz) is presently in use in a cellular communication system. This includes generating a first type of synchronization signal in response to the first subcarrier spacing presently being in use, and generating a second type of synchronization signal in response to the second subcarrier spacing presently being in use. Whichever of the first type of synchronization signal and the second type of synchronization signal was generated is transmitted. A time domain representation of the second type of synchronization signal includes a plurality of instances of the first type of synchronization signal.

In another aspect, a radio interface of the cellular communication system utilizes Orthogonal Frequency Division Multiplexing (OFDM); generating the first type of synchronization signal comprises mapping a set of synchronization symbols, $S_k$, ($0 \leq k \leq N-1$) onto a contiguous set of N subcarriers, each of the N subcarriers having the first subcarrier spacing; and generating the second type of synchronization signal comprises mapping the set of synchronization symbols, $S_k$, onto a set of n·N subcarriers (n>1) such that every $n^{th}$ one of the n·N carries one of the N synchronization symbols, and remaining ones of the n·N subcarriers carry zero values, wherein each of the n·N subcarriers has the second subcarrier spacing.

In yet another aspect, the time domain representation of the second type of synchronization signal consists of two instances of the first type of synchronization signal.

In another aspect of embodiments consistent with the invention, apparatuses and methods detect which of a first subcarrier spacing (e.g., 15 kHz) and a second subcarrier spacing (e.g., 7.5 kHz) is presently in use in a cellular communication system. This includes processing a received signal to derive therefrom a synchronization signal. It is then detected whether a time domain representation of the synchronization signal comprises only one instance of a first type of synchronization signal. If the time domain representation of the synchronization signal comprises only one instance of the first type of synchronization signal, then the first subcarrier spacing is utilized in one or more subsequent communication operations. Otherwise, if the time domain representation of the synchronization signal comprises more than one instance of the first type of synchronization signal, then the second subcarrier spacing is utilized in one or more subsequent communication operations.

In some embodiments, detecting whether the time domain representation of the synchronization signal comprises only one instance of the first type of synchronization signal comprises: generating correlation results by correlating the received signal against the first type of synchronization signal; and detecting whether the correlation results include distinct peaks separated in time by a predetermined amount.

In alternative embodiments, detecting whether the time domain representation of the synchronization signal comprises only one instance of the first type of synchronization signal comprises generating correlation results by correlating the received signal with a delayed copy of the received signal, wherein an amount of delay applied to generate the delayed copy of the received signal corresponds to a time period of first type of synchronization signal; and detecting whether the correlation results include a distinct peak.

In still other alternative embodiments, indicating which of a first subcarrier spacing and a second subcarrier spacing is presently in use in a cellular communication system involves generating a first type of synchronization signal in response to the first subcarrier spacing presently being in use, and generating a second type of synchronization signal in response to the second subcarrier spacing presently being in use. Whichever one of the first type of synchronization signal and the second type of synchronization signal was generated is then transmitted. In such embodiments, a time domain representation of the first type of synchronization signal includes a first plurality of instances of a basic waveform; a time domain representation of the second type of synchronization signal includes a second plurality of instances of the basic waveform; and the first plurality is not equal to the second plurality.

In still other embodiments, detecting which of a first subcarrier spacing and a second subcarrier spacing is presently in use in a cellular communication system involves processing a received signal to derive therefrom a synchronization signal, and detecting how many instances of a basic waveform are included in a time domain representation of the synchronization signal. If the time domain representation of the synchronization signal comprises a first plurality of instances of the basic waveform, then the first subcarrier spacing is utilized in one or more subsequent communication operations. If the time domain representation of the synchronization signal comprises a second plurality of instances of the basic waveform, then the second subcarrier spacing is utilized in one or more subsequent communication operations, wherein the first plurality is not equal to the second plurality.

BRIEF DESCRIPTION OF THE DRAWINGS

The objects and advantages of the invention will be understood by reading the following detailed description in conjunction with the drawings in which.

DETAILED DESCRIPTION

Figure 1:
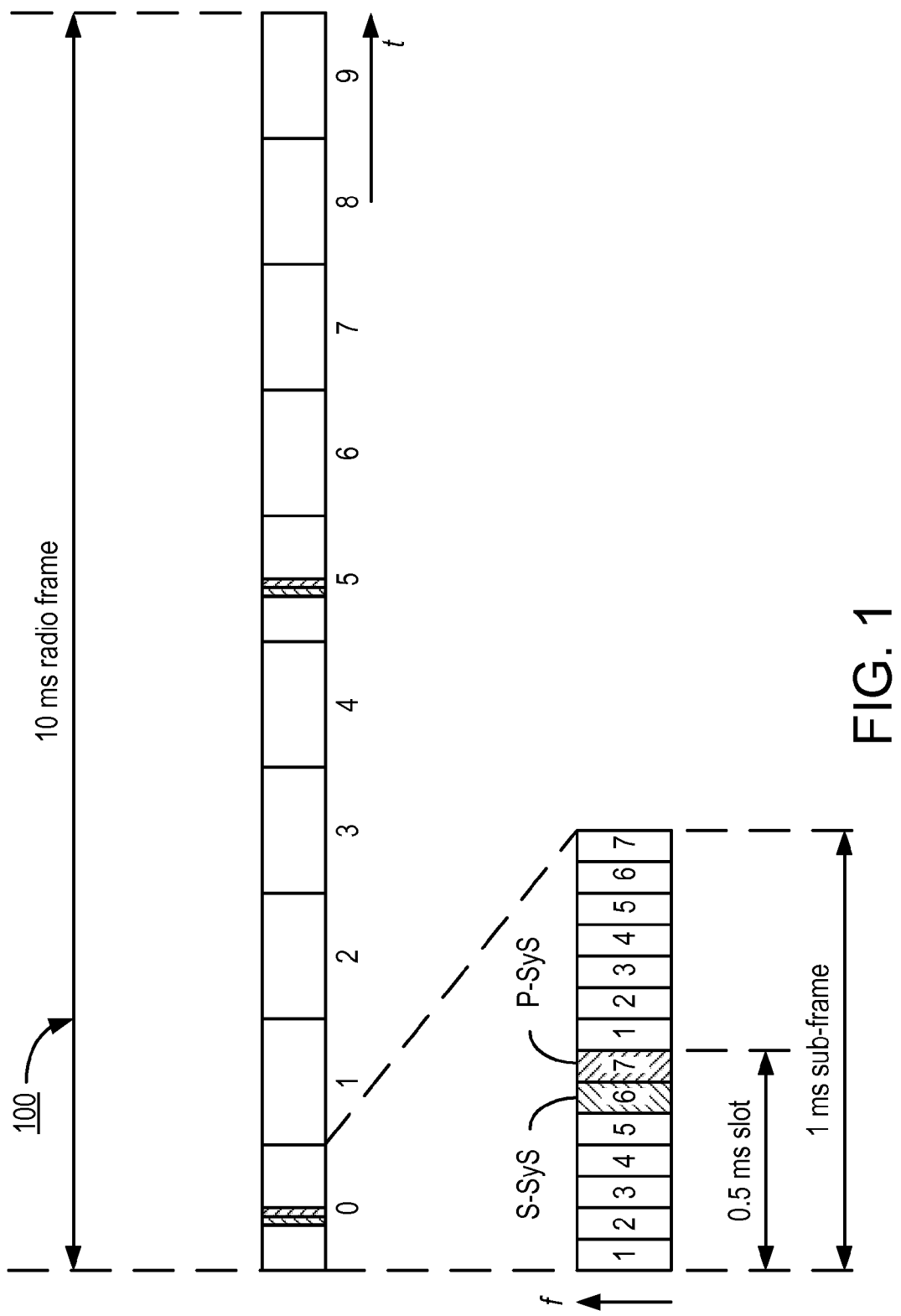
FIG. 1 is a timing diagram of a generic radio frame utilized in an LTE system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of the embodiments consistent with the invention, a Primary SyS ("P-SyS") is provided and utilized in a communication system, wherein a first type of synchronization signal, herein denoted P-SyS$_{MODE1}$, is utilized when the subcarrier spacing is the larger of two possible spacings (e.g., 15 kHz per subcarrier) and a second type of synchronization signal, herein denoted P-SyS$_{MODE2}$, is used when the subcarrier spacing is the smaller of the two possible spacings (e.g., 7.5 kHz per subcarrier), wherein the second type of synchronization signal is formed as a function of the first type of synchronization signal. In a more specific embodiment, the second type of synchronization signal comprises two or more instances of the first type of synchronization signal in immediate succession.

In another aspect of embodiments consistent with the invention, in use, if the detected synchronization signal contains two or more of the first type of synchronization signal in immediate succession, then the detected cell is ascertained to have a subcarrier spacing associated with the smaller of the two spacings (e.g., 7.5 kHz), whereas if no repetitions are detected, the detected cell is ascertained to have a subcarrier spacing associated with the larger of the two spacings (e.g., 15 kHz).

These and other aspects are described in greater detail in the following discussion.

The following description is set in the context of an LTE system. However, this is done merely to facilitate the reader's understanding of the various aspects (e.g., by utilizing terminology that will be readily understood by those having ordinary skill in the art). The use of LTE terminology, methods and apparatuses to illustrate the various aspects of the invention should not be construed to limit the scope of the invention, or to in any way suggest that the invention is limited only to LTE embodiments. To the contrary the various aspects of embodiments consistent with the invention are equally applicable to many other systems that share relevant characteristics with LTE systems (e.g., reliance on a synchronization signal to, for example, make an initial determination of things such as signal timing), but are different in other ways.

The P-SyS in LTE is constructed by mapping a sequence $S_k$, k=0, 1, . . . , N−1, onto the subcarrier used for the synchronization signal. After Inverse Fast Fourier Transform (IFFT) processing, this results in the time domain signal $$s_{15kHz}(n) = \sum_{k=0}^{N-1} S_k e^{(j2\pi/N)k \cdot n}, \quad n = 0, 1, \ldots, N-1 \quad (1)$$

where n is a sample number, and N is the number of subcarriers.

Some of the $S_k$ values can actually be set to zero in order to confine the time domain signal, s(n), to its bandwidth. The inclusion of zeros may also be necessary to avoid DC distortion.

Figure 2A:
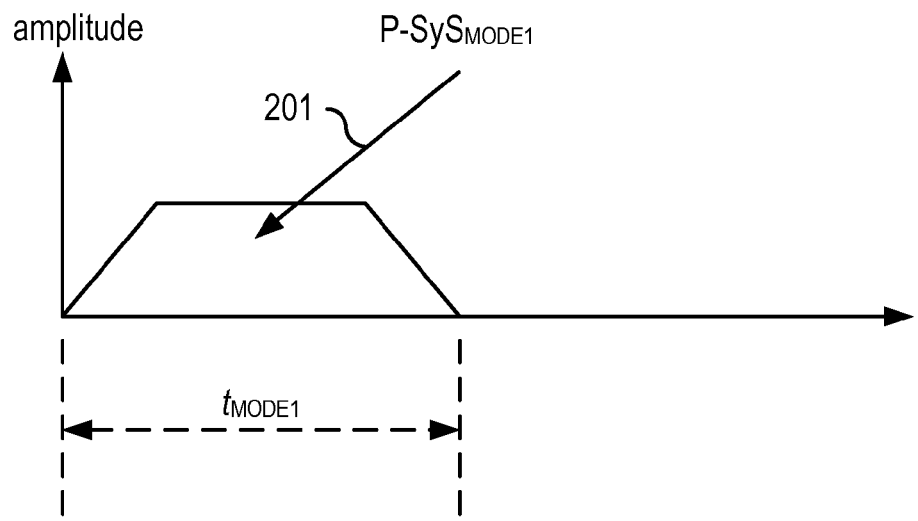
FIG. 2A is a diagram illustrating a first type of synchronization signal, which is used when a subcarrier spacing is a larger of two possible sizes.
Figure 2B:
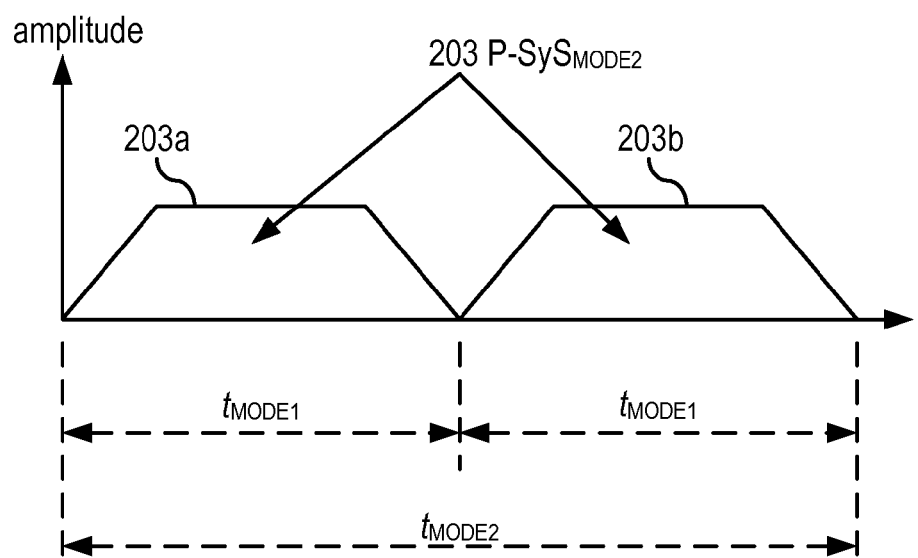
FIG. 2B is a diagram illustrating a second type of synchronization signal, which is used when a subcarrier spacing is a smaller of two possible sizes.

In the exemplary embodiment, two modes of operation are presented, each having its own subcarrier spacing: a first mode which does not involve SFN (e.g., unicast transmissions), and a second mode which does involve SFN. In an aspect of the invention, the P-SyS for the second type of subcarrier spacing (P-SyS$_{MODE2}$) is created such that—in the time domain—it is a replica of the P-SyS used in the first mode of operation (e.g., non-SFN use) (P-SyS$_{MODE1}$) plus one or more immediate repetitions of that signal. FIGS. 2A and 2B are time domain signal diagrams that illustrate this point. Specifically, each of FIGS. 2A and 2B is a graph of the amplitude of transmitted signals plotted as a function of time. The shapes of the various illustrated signals are intended to merely represent the presence of the signals, and are not intended to represent actual waveforms.

FIG. 2A illustrates a first type of synchronization signal 201, which is used when a subcarrier spacing is a larger of two possible sizes (herein illustrated as P-SyS$_{MODE1}$). The duration of the first type of synchronization signal 201 is herein denoted t$_{MODE1}$. The first type of synchronization signal 201 is generated in accordance with Equation (1), with the symbols, $S_k$, being mapped onto N contiguous subcarriers. In embodiments such as LTE, one of the subcarriers is DC, and for this reason is punctured. Accordingly, in such embodiments SDC should be set equal to zero.

FIG. 2B is a diagram illustrating a second type of synchronization signal 203, which is used when a subcarrier spacing is a smaller of two possible sizes (herein illustrated as P-SyS$_{MODE2}$). The second type of synchronization signal 203 comprises two (or in other embodiments, more than two) components (in this example denoted first component 203a and second component 203b) transmitted in immediate succession during two (or in other embodiments, more than two) contiguous time periods for a total duration of t$_{MODE2}$. In the time domain, the waveform of each of the first and second components 203a, 203b of the second type of synchronization signal 203 is identical to that of the first type of synchronization signal 201. Consequently, each of the first and second components 203a, 203b has a duration equal to t$_{MODE1}$ and can be considered an instance of the first type of synchronization signal 201.

Figure 3A:
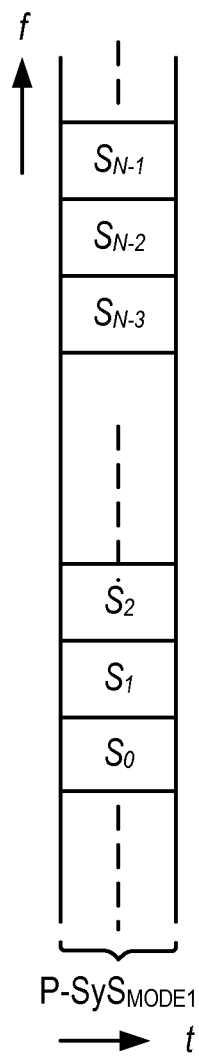
FIG. 3A is a time-frequency diagram showing the mapping of the $P\text{-}SyS_{MODE1}$ signal, in which all N of the modulation symbols, $S_k$, are mapped to contiguous subcarriers.
Figure 3B:
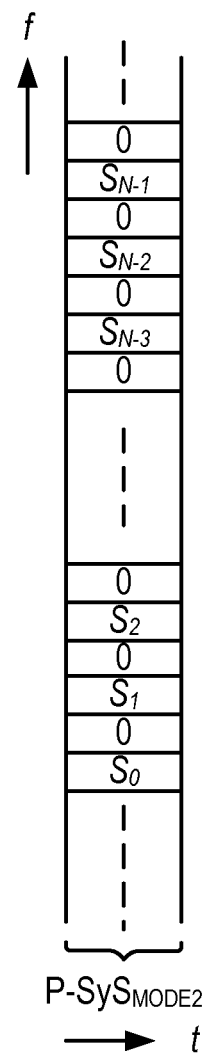
FIG. 3B is a time-frequency diagram showing the exemplary mapping of the $P\text{-}SyS_{MODE2}$ signal, in which the same N modulation symbols, $S_k$, are mapped to every other one of a group of 2N subcarriers, with remaining subcarriers set to zero, in accordance with an aspect of the invention.

A P-SyS$_{MODE2}$ having this property is easily constructed by using the sequence $S_k$ associated with the P-SyS$_{MODE1}$ (i.e., the P-SyS of the larger of the two possible sizes) and mapping it to every n-th one of n·N subcarriers (where n>1). The remaining subcarriers within the bandwidth allocated for the P-SyS are then populated with zeros. (Subcarriers outside the P-SyS bandwidth should also be treated as zeros, but this can be achieved by filtering on the receiver side, so actual population with zeros is not essential in practice.) The resulting time domain waveform of the P-SyS$_{MODE2}$ will have a waveform comprising n contiguous instances of the P-SyS$_{MODE1}$ waveform. For the case in which the spacing for SFN operation is half the original subcarrier spacing, the original P-SyS sequence is preferably mapped to every second subcarrier (i.e., n=2), resulting in two successive (and contiguous) instances of the P-SyS$_{MODE1}$ waveform in the time domain. This is illustrated in FIGS. 3A and 3B, wherein FIG. 3A is a time-frequency diagram showing the mapping of the P-SyS$_{MODE1}$ signal (all N of the modulation symbols, $S_k$, are mapped to contiguous subcarriers), and FIG. 3B is a time-frequency diagram showing the exemplary mapping of the P-SyS$_{MODE2}$ signal (the same N modulation symbols, $S_k$, are in this case mapped to every other one of a group of 2N subcarriers, with remaining subcarriers set to zero).

More generally, mapping should be in accordance with the ratio of the "original" subcarrier spacing divided by the new (smaller) subcarrier spacing. For example, if the subcarrier spacing were only one-third the size of the "original" subcarrier spacing, the N modulation symbols, $S_k$, would be mapped to every third one of a group of 3N subcarriers, with remaining subcarriers set to zero.

With mapping to every other one of a group of 2N subcarriers as described above, the size of the IFFT needed to convert the P-SyS$_{MODE2}$ is twice as large (i.e., 2N instead of N), so the number of generated time-domain samples is also twice as large: 2N. Assume that the sequence representing P-SyS$_{MODE2}$ is given by:

$$\hat{S}_k = \begin{cases} S_{k/2} & \text{for } k = \text{even} \\ 0 & \text{for } k = \text{odd} \end{cases} \quad (2)$$

where $S_{k/2}$ is the sequence for P-SyS$_{MODE1}$. Then the time domain signal obtained from the exemplary P-SyS$_{MODE2}$ after IFFT processing is $$s_{7.5kHz}(n) = \sum_{k=0}^{2N-1} \hat{S}_k e^{(j2\pi/(2N))\cdot k \cdot n} \quad (3)$$

$$= \underbrace{\sum_{\substack{k=0 \\ k \text{ even}}}^{2N-1} \hat{S}_k e^{(j2\pi/(2N))\cdot k \cdot n}}_{} + \underbrace{\sum_{\substack{k=0 \\ k \text{ odd}}}^{2N-1} \hat{S}_k e^{(j2\pi/(2N))\cdot k \cdot n}}_{0 \text{ since } \hat{S}_k \text{ is } 0 \text{ for odd } k}$$

$$= \sum_{\substack{k=0 \\ k \text{ even}}}^{2N-1} \hat{S}_k e^{(j2\pi/(2N))\cdot k \cdot n}, \quad n = 0, 1, \ldots, 2N-1.$$

Now, substituting $k \to 2k'$ and letting $k'$ run from 0 to N−1 (k then runs from 0 to 2N−1 populating only even values), we obtain:

$$s_{7.5kHz}(n) = \sum_{k'=0}^{N-1} \hat{S}_{2k'} e^{(j2\pi/(2N))\cdot 2k' \cdot n}, \quad n = 0, 1, \ldots, 2N-1. \quad (4)$$

With $\hat{S}_{2k'} = S_{k'}$ (because $\hat{S}_{2k}$ is $S_k$, see equation (2)), we obtain:

$$s_{7.5kHz}(n) = \sum_{k'=0}^{N-1} S_{k'} e^{(j2\pi/(2N))\cdot 2k' \cdot n} \quad (5)$$

$$= \sum_{k=0}^{N-1} S_k e^{(j2\pi/N)\cdot k \cdot n}, \quad n = 0, 1, \ldots, 2N-1,$$

which is exactly two instances of the original signal (i.e., P-SyS$_{MODE1}$) generated in contiguous succession.

With this P-SyS structure the presence or absence of multiple instances of the P-SyS waveform indicates which of the subcarrier spacings is being used: only one instance means that the subcarrier spacing is 15 kHz, two (or in other embodiments, more) instances means that the subcarrier spacing is 7.5 kHz. Since the P-SyS waveform for the 7.5 kHz case is the same as the P-SyS waveform for the 15 kHz case but transmitted multiple times (preferably two times), the same synchronization circuitry in the UE is capable of detecting the P-SyS for both subcarrier spacings: In the case of a 15 kHz subcarrier spacing, the synchronization metric has one peak and in the case of a 7.5 kHz subcarrier spacing, the synchronization metric poses multiple peaks.

Figure 4A:
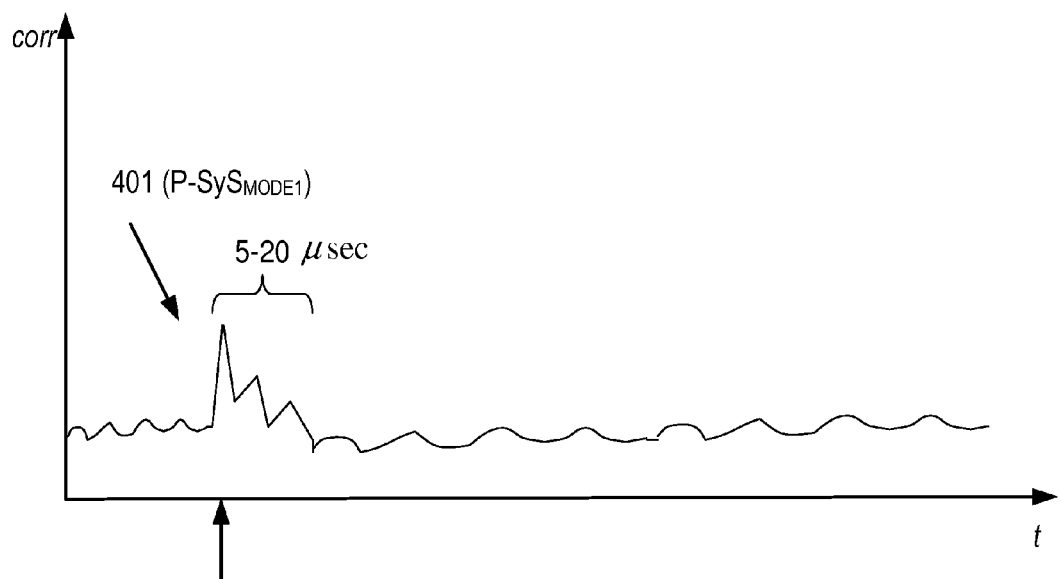
FIG. 4A illustrates an exemplary correlation results waveform when the received signal includes a $P\text{-}SyS_{MODE1}$.
Figure 4B:
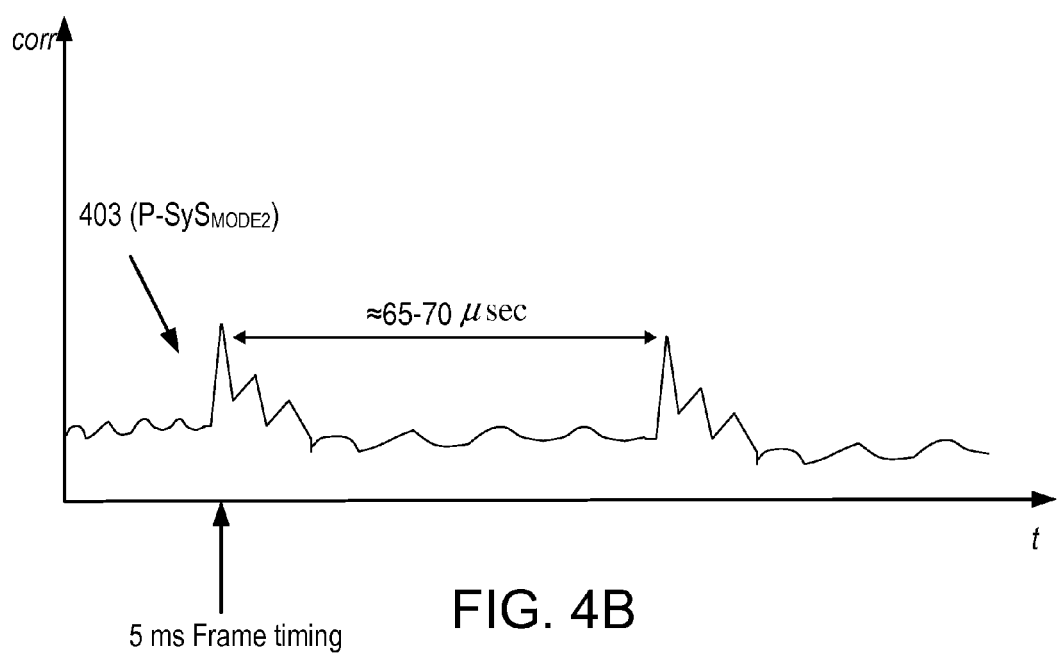
FIG. 4B illustrates an exemplary correlation results waveform when the received signal includes a $P\text{-}SyS_{MODE2}$, in accordance with an aspect of the invention.

In practice, the synchronization metric peaks are typically made up of a number of clustered peaks due to the radio channel delay spread (i.e., the clustered peaks correspond to the entire power delay profile—"PDP"). However, in a typical LTE system, the delay spread is on the order of a few microseconds (e.g., worst case up to about 15-20 microseconds), so the P-SyS$_{MODE1}$ waveform can be detected. An exemplary correlation results waveform 401 obtained when a received signal containing a P-SyS$_{MODE1}$ is correlated against the known P-SyS$_{MODE1}$ is illustrated in FIG. 4A. By contrast, the multiple peaks that occur when a received signal containing a P-SyS$_{MODE2}$ is correlated against the known P-SyS$_{MODE1}$ (i.e., the correlation results obtained in the 7.5 kHz subcarrier spacing case) are separated by a time distance that is on the order of 65-70 microseconds (corresponding to one OFDM symbol, in the 15 kHz subcarrier spacing case). The correlation results 403 obtained for the 7.5 kHz subcarrier spacing case are illustrated in FIG. 4B. Because of the relatively large separation between the multiple peaks associated with the 7.5 kHz subcarrier spacing, they are easily distinguishable from multiple peaks associated with typical delay spread.

Figure 5:
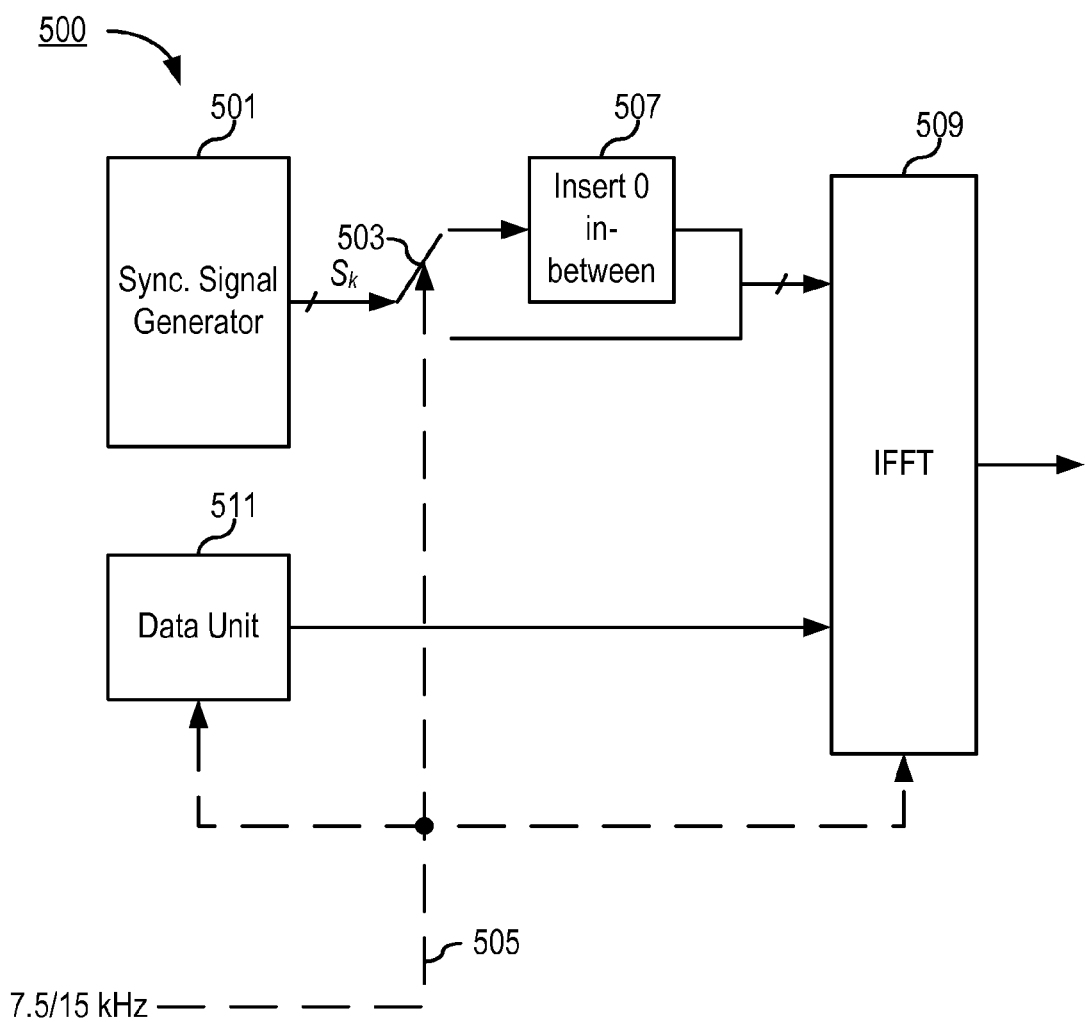
FIG. 5 is a block diagram of relevant components in a transmitter for generating a P-SyS signal in accordance with aspects of the invention.

FIG. 5 is a block diagram of relevant components 500 in a transmitter for generating a P-SyS signal in accordance with aspects of the invention. In this exemplary embodiment, it is assumed that n=2 (i.e., to indicate the smaller (e.g., 7.5 kHz) subcarrier spacing, the synchronization signal sequence elements are mapped to every other subcarrier, with zeros mapped in-between. A synchronization signal generator 501 generates the sequence, $S_k$, and supplies these to the input of a switch. The switch 503 is controlled by a signal 505 that indicates whether the subcarrier spacing is the smaller (e.g., 7.5 kHz) or the larger (e.g., 15 kHz) of the two possible values. When the smaller of the two possible spacings is indicated by the signal 505, the switch 503 routes the sequence, $S_k$, to logic 507 that inserts zeros in-between the $S_k$ symbols. In this example, only one zero is inserted in-between two $S_k$ symbols, but in other embodiments, the logic 507 that inserts zeros in-between the $S_k$ symbols can insert more than one zero between $S_k$ symbols, depending upon whether it is desired to generate more than two instances of the basic P-SyS waveform. The output of the logic 507 that inserts zeros in-between $S_k$ symbols is supplied to those inputs of an Inverse Fast Fourier Transform (IFFT) 509 associated with the P-SyS.

If the signal 505 indicates that the larger of the two possible subcarrier spacings is in effect, then the switch 503 causes the $S_k$ symbols to be routed directly to the corresponding inputs of the IFFT 509—the logic 507 that inserts zeros in-between $S_k$ symbols is, in this instance, bypassed.

A data unit 511 generates other data that is supplied to other inputs of the IFFT 509. The signal 505 is supplied to a control input of each of the data unit 511 and the IFFT 509 to control, in the case of the data unit 511, how many symbols are generated, and, in the case of the IFFT 509, how many input symbols will be processed and the effective size of the IFFT 509.

The output of the IFFT 509 is the OFDM modulated signal that will be transmitted during the OFDM symbol time associated with the P-SyS.

Figure 6:
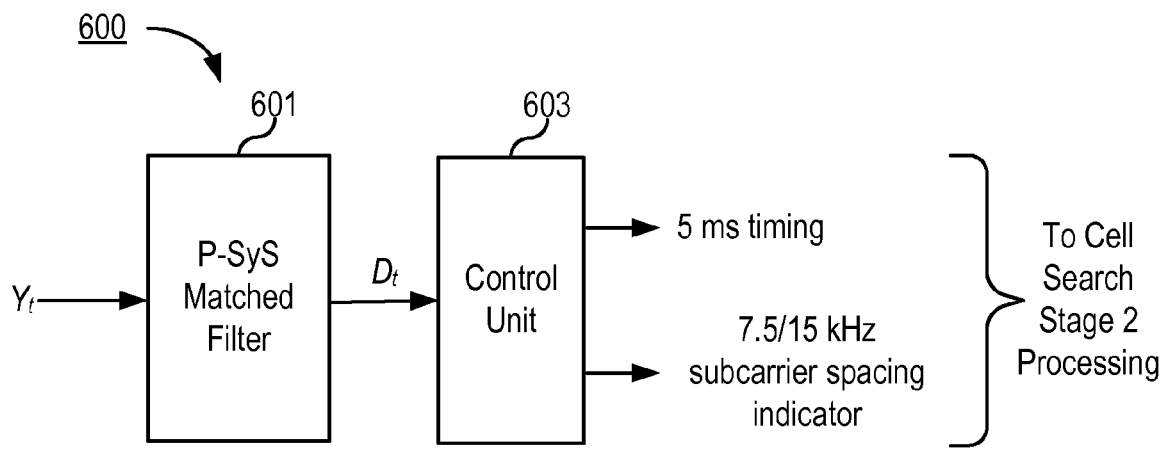
FIG. 6 is a block diagram of relevant components of an exemplary synchronization channel receiver in a UE that is capable of detecting the indication of subcarrier spacing in accordance with another aspect of embodiments consistent with the invention.

FIG. 6 is a block diagram of relevant components of an exemplary synchronization channel receiver 600 in a UE that is capable of detecting the indication of subcarrier spacing in accordance with another aspect of embodiments consistent with the invention. It is assumed that the supplied signal, $Y_t$, is supplied by a filter that substantially eliminates frequency components lying outside the allocated spacing of the P-SyS. The synchronization channel receiver 600 includes a matched filter (correlator) 601 that is matched to one period of the P-SyS. The output ($D_t$) of the matched filter 601 is supplied to a control unit 603 that analyzes the matched filter output signal and generates therefrom the 5 ms timing information and a signal that indicates whether the detected cell is using a 7.5 kHz or 15 kHz subcarrier spacing. As described earlier, the control unit 603 in this example bases this decision on whether only a single P-SyS response was detected (i.e., P-SyS$_{MODE1}$), or whether multiple (e.g., two) P-SyS power delay profiles (i.e., P-SyS$_{MODE2}$) were detected.

Figure 7:
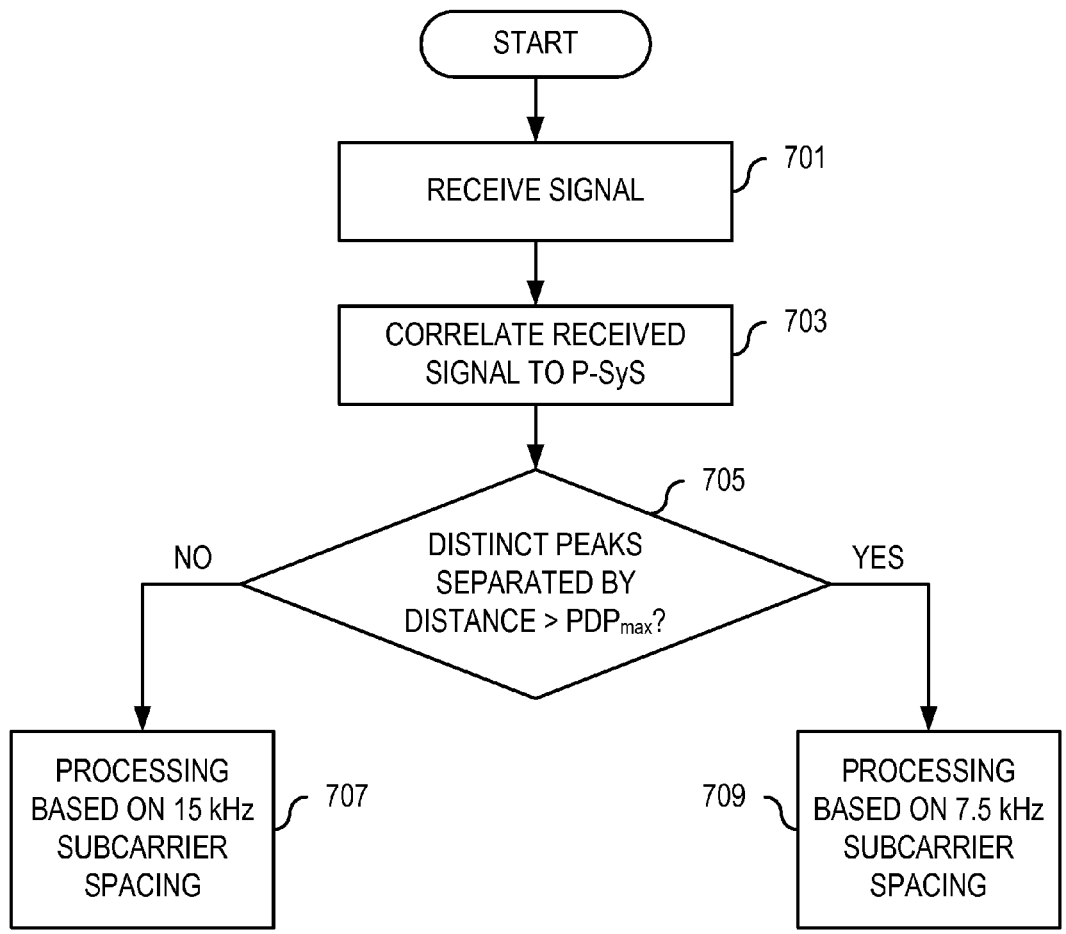
FIG. 7 is a flow chart of exemplary steps that can be carried out by circuitry in a UE that detects the indication of subcarrier spacing in accordance with another aspect of embodiments consistent with the invention.

FIG. 7 is a flow chart of exemplary steps that can be carried out by circuitry (e.g., the control unit 603) in a UE that detects the indication of subcarrier spacing in accordance with another aspect of embodiments consistent with the invention. A signal is received (step 701) and processed by a matched filter, which correlates the received signal to a known P-SyS$_{MODE1}$ (step 703). The results from this processing are then analyzed by, for example, a control unit that tests whether the correlation result includes distinct peaks separated by a distance greater than an expected delay spread associated with the radio channel (PDP$_{max}$) (decision block 705). A value of PDP$_{max}$ can, for example, be 20 microseconds. If distinct peaks are not detected ("NO" path out of decision block 705), then 15 kHz subcarrier spacings have been detected, and processing proceeds accordingly (step 707). Otherwise ("YES" path out of decision block 705), 7.5 kHz subcarrier spacings have been detected, and processing proceeds accordingly (step 709).

Alternative subcarrier spacing detection algorithms can also be implemented for use in a UE. In one such example, a differential correlator correlates the received signal with a delayed copy of itself. In this case, the delay corresponds to the time period of the P-SyS for the larger subcarrier spacing (i.e., P-SyS$_{MODE1}$) (e.g., 1/15 kHz=66 μsec), and the integration time can be any duration larger than the longest cyclic prefix and up to the time period of the original P-SyS—e.g., 1/15 kHz. When the time domain representation of the synchronization signal comprises more than one instance of the P-SyS$_{MODE1}$, the correlator results will include a distinct peak. Such a detector is similar to a blind cyclic prefix estimator and therefore the smallest integration time should be larger than the longest cyclic prefix, otherwise a cyclic prefix might be detected rather than a repetition.

The proposed P-SyS structure enables a very simple structure and technique for detecting subcarrier spacing. No additional synchronization channel detection circuitry is needed for the smaller (e.g., 7.5 kHz) subcarrier spacing because the synchronization channel detection circuitry matched to the larger (e.g., 15 kHz) subcarrier spacing automatically also detects the P-SyS when 7.5 kHz subcarrier spacings are used.

The invention has been described with reference to particular embodiments. However, it will be readily apparent to those skilled in the art that it is possible to embody the invention in specific forms other than those of the embodiment described above.

For example, the exemplary embodiments described above assumed that only two different subcarrier spacings needed to be indicated and detected. However, alternative embodiments could be designed, using the principles described above, in which more than two different subcarrier spacings are indicated and detected. In such cases, each of the possible subcarrier spacings can be uniquely associated with a different number of instances of the "original" P-SyS waveform, for example one instance of the waveform to indicate use of a first subcarrier spacing, two instances of the waveform to indicate use of a second subcarrier spacing, three instances of the waveform to indicate use of a third subcarrier spacing, and so on.

Also, the exemplary embodiments described above assumed that one of the subcarrier spacings (e.g., 15 kHz) was associated with the occurrence of only one instance of the "original" P-SyS waveform. However, this is not essential to the invention. To the contrary, the invention can more generally be defined as involving a number of different subcarrier spacings wherein each is uniquely associated with one of a like number of possible P-SyS waveforms, each of the possible P-SyS waveforms having a different number of instances of a "basic" waveform, thereby making them distinguishable from one another. For example, in an embodiment involving two possible subcarrier spacings (e.g., 15 kHz and 7.5 kHz), a first of these subcarrier spacings can be indicated by two occurrences of a "basic" waveform, and a second of these subcarrier spacings can be indicated by four occurrences of the "basic" waveform. This can be achieved by, for example, mapping the $S_k$ symbols onto every other subcarrier (with zeros inserted in-between) for the first of the subcarrier spacings, and mapping the $S_k$ symbols onto every fourth subcarrier (with zeros inserted in-between) for the second of the subcarrier spacings.

In yet another exemplary embodiment involving two possible subcarrier spacings (e.g., 15 kHz and 10 kHz), a first of these subcarrier spacings can be indicated by two occurrences of a "basic" waveform and a second of these subcarrier spacings can be indicated by three occurrences of the "basic" waveform. To implement this, the $S_k$ symbols are mapped onto every second subcarrier (with zeros inserted in-between) for the case of 15 kHz subcarrier spacing, and are mapped onto every third subcarrier (with zeros inserted in-between) for the case of 10 kHz. This works out because in the 15 kHz subcarrier spacing mode, the OFDM symbol length is 1/15 kHz=66.67 μs. When the $S_k$ symbols are placed on every second subcarrier, the "effective" subcarrier spacing is 2×15=30 kHz, and the duration of the "basic" P-SyS waveform is 1/30 kHz=33.33 μs. Therefore, in one OFDM symbol (=66.67 μs) two basic waveforms are contained.

For the 10 kHz subcarrier spacing mode, the OFDM symbol length is 1/10 kHz=100 μs. When the $S_k$ symbols are placed on every third subcarrier (with zeros inserted in-between), the "effective" subcarrier spacing is 3×10=30 kHz, and the duration of the "basic" P-SyS waveform is 1/30 kHz=33.33 μs. Therefore, in one OFDM symbol (=100 μs) three basic waveforms are contained. That three instances of the basic waveform will be produced by placing the $S_k$ symbols onto every third subcarrier can be shown by equations analogous to equations 2 through 5.

Various embodiments consistent with the above teachings will now be described with reference to FIGS. 8 through 12.

Figure 8:
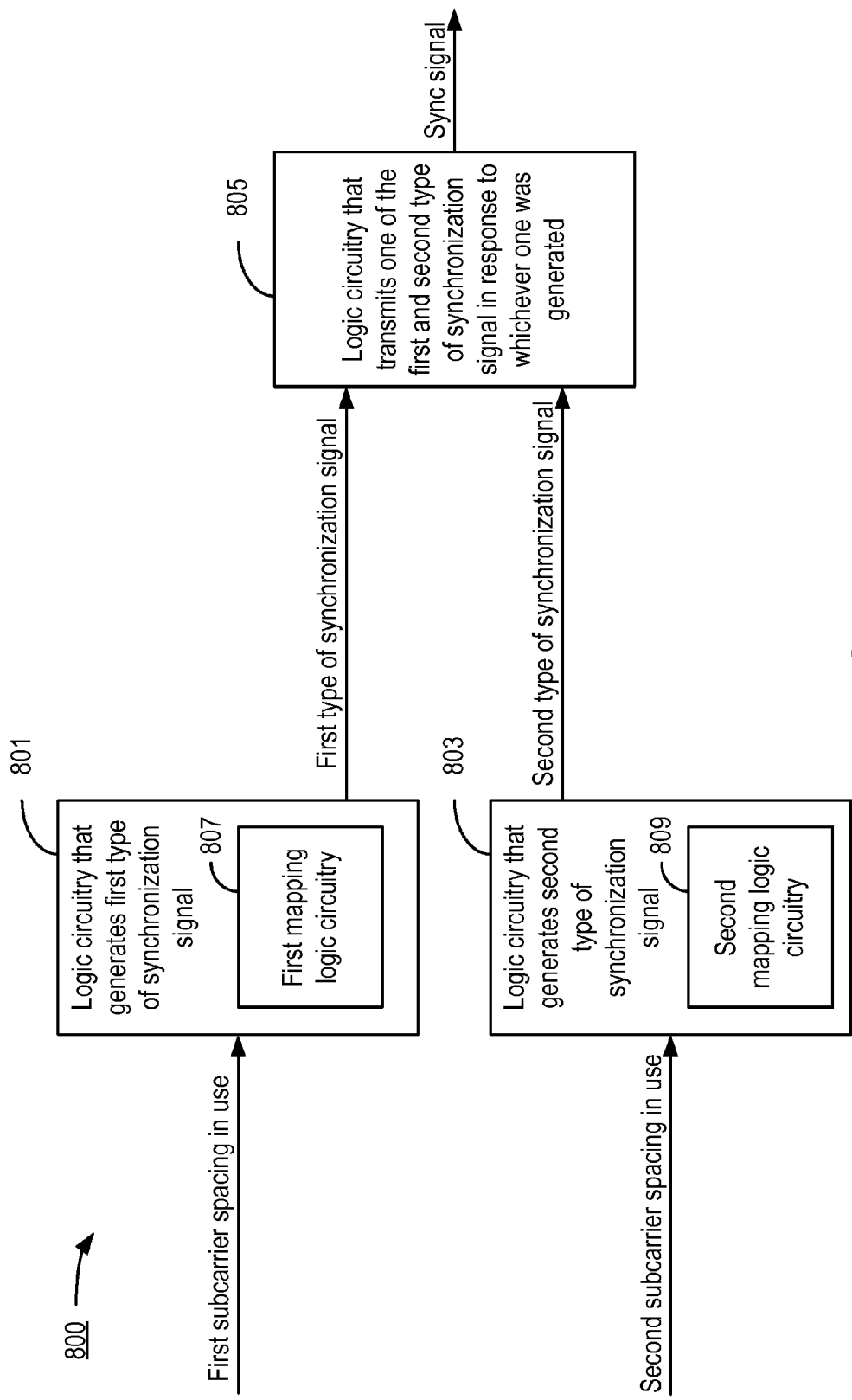
FIG. 8 depicts an embodiment of an apparatus 800 for indicating which of a first subcarrier spacing and a second subcarrier spacing is presently in use in a cellular communication system.

FIG. 8 depicts an embodiment of an apparatus 800 for indicating which of a first subcarrier spacing and a second subcarrier spacing is presently in use in a cellular communication system. The exemplary apparatus 800 comprises logic circuitry 801 that responds to the first subcarrier spacing presently being in use by generating a first type of synchronization signal, and logic circuitry 803 that responds to the second subcarrier spacing presently being in use by generating a second type of synchronization signal. A time domain representation of the second type of synchronization signal includes a plurality of instances of the first type of synchronization signal. The apparatus 800 further includes logic circuitry that transmits one of the first type of synchronization signal and the second type of synchronization signal in response to whichever of the first type of synchronization signal and the second type of synchronization signal was generated.

In another aspect of the embodiment depicted in FIG. 8, a radio interface of the cellular communication system utilizes Orthogonal Frequency Division Multiplexing (OFDM). Accordingly, the logic circuitry 801 that generates the first type of synchronization signal comprises first mapping logic circuitry 807 that maps a set of synchronization symbols, $S_k$, ($0 \leq k \leq N-1$) onto a contiguous set of N subcarriers, each of the N subcarriers having the first subcarrier spacing. Further, the logic circuitry 803 that generates the second type of synchronization signal comprises second mapping logic circuitry 809 that maps the set of synchronization symbols, $S_k$, onto a set of n·N subcarriers (n>1) such that every $n^{th}$ one of the n·N carries one of the N synchronization symbols, and remaining ones of the n·N subcarriers carry zero values, wherein each of the n·N subcarriers has the second subcarrier spacing, and wherein k, N, and n are integers.

Figure 9:
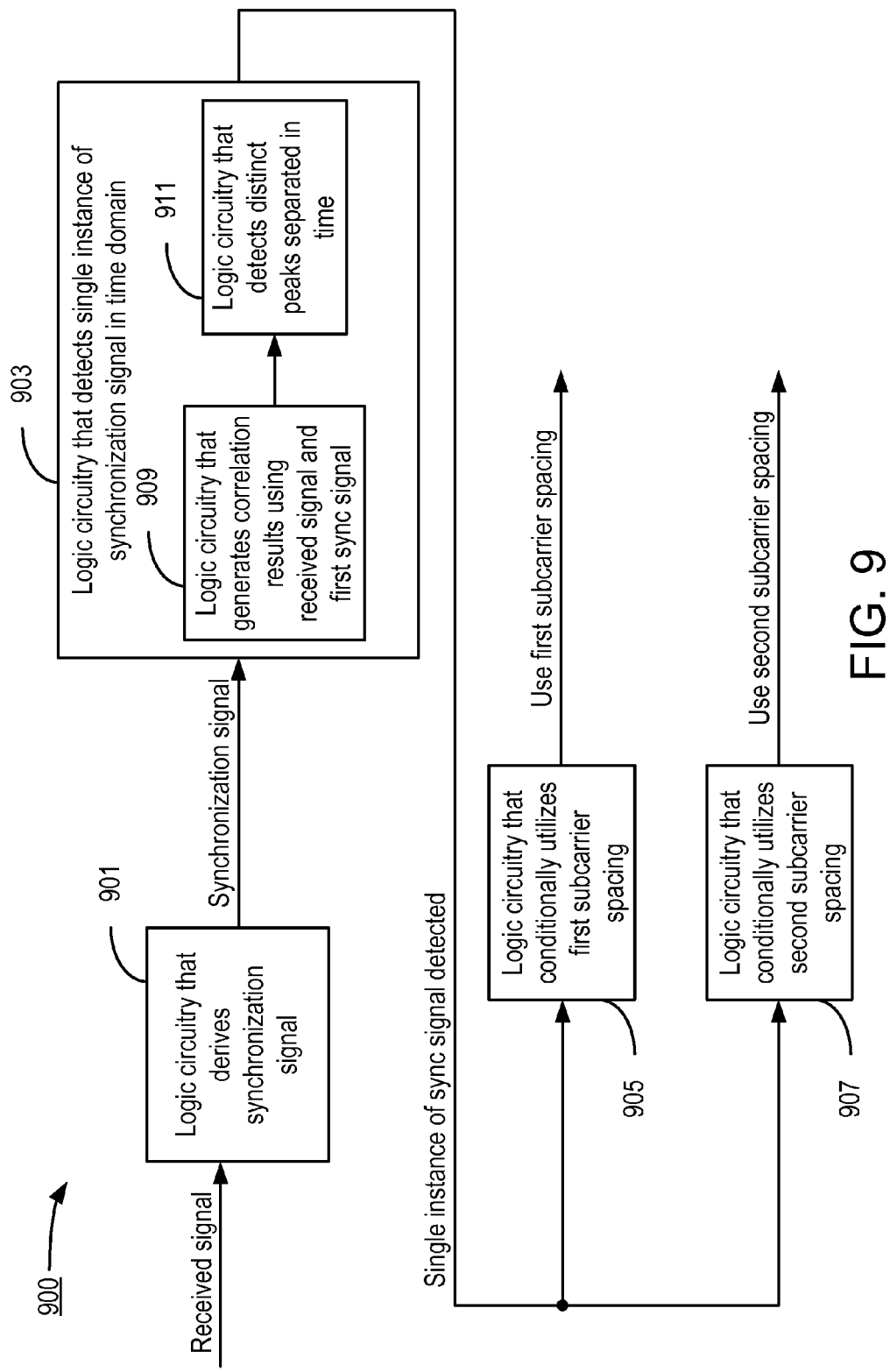
FIG. 9 depicts an embodiment of an apparatus 900 for detecting which of a first subcarrier spacing and a second subcarrier spacing is presently in use in a cellular communication system.

FIG. 9 depicts an embodiment of an apparatus 900 for detecting which of a first subcarrier spacing and a second subcarrier spacing is presently in use in a cellular communication system. The exemplary apparatus 900 comprises logic circuitry 901 that processes a received signal to derive therefrom a synchronization signal. The apparatus 900 further comprises logic circuitry 903 that detects whether a time domain representation of the synchronization signal comprises only one instance of a first type of synchronization signal. Also, the apparatus 900 includes logic circuitry 905 that utilizes the first subcarrier spacing in one or more subsequent communication operations if the time domain representation of the synchronization signal comprises only one instance of the first type of synchronization signal; and logic circuitry 907 that utilizes the second subcarrier spacing in one or more subsequent communication operations if the time domain representation of the synchronization signal comprises more than one instance of the first type of synchronization signal.

In another aspect of the embodiment depicted in FIG. 9, the logic circuitry 903 that detects whether the time domain representation of the synchronization signal comprises only one instance of the first type of synchronization signal comprises logic circuitry 909 that generates correlation results by correlating the received signal against the first type of synchronization signal; and logic circuitry 911 that detects whether the correlation results include distinct peaks separated in time by a predetermined amount.

Figure 10:
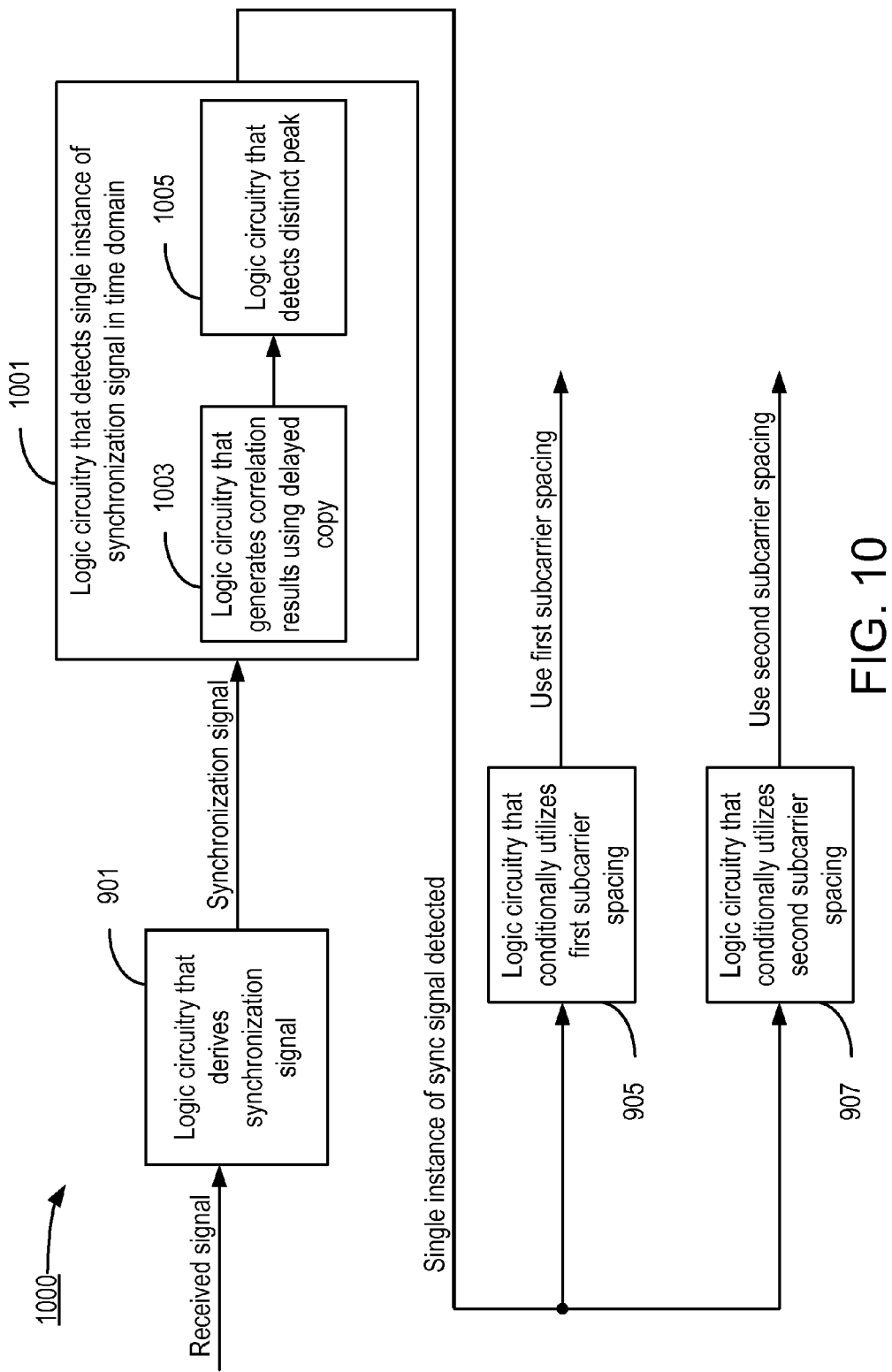
FIG. 10 depicts an alternative embodiment of an apparatus 1000 for detecting which of a first subcarrier spacing and a second subcarrier spacing is presently in use in a cellular communication system.

FIG. 10 depicts an alternative embodiment of an apparatus 1000 for detecting which of a first subcarrier spacing and a second subcarrier spacing is presently in use in a cellular communication system. The exemplary apparatus 1000 comprises logic circuitry 901 that processes a received signal to derive therefrom a synchronization signal. The apparatus 1000 further comprises logic circuitry 1001 that detects whether a time domain representation of the synchronization signal comprises only one instance of a first type of synchronization signal. Also, the apparatus 1000 includes logic circuitry 905 that utilizes the first subcarrier spacing in one or more subsequent communication operations if the time domain representation of the synchronization signal comprises only one instance of the first type of synchronization signal; and logic circuitry 907 that utilizes the second subcarrier spacing in one or more subsequent communication operations if the time domain representation of the synchronization signal comprises more than one instance of the first type of synchronization signal.

In this embodiment, the logic circuitry 1001 that detects whether the time domain representation of the synchronization signal comprises only one instance of the first type of synchronization signal comprises: logic circuitry 1003 that generates correlation results by correlating the received signal with a delayed copy of the received signal, wherein an amount of delay applied to generate the delayed copy of the received signal corresponds to a time period of first type of synchronization signal; and logic circuitry 1005 that detects whether the correlation results include a distinct peak.

Figure 11:
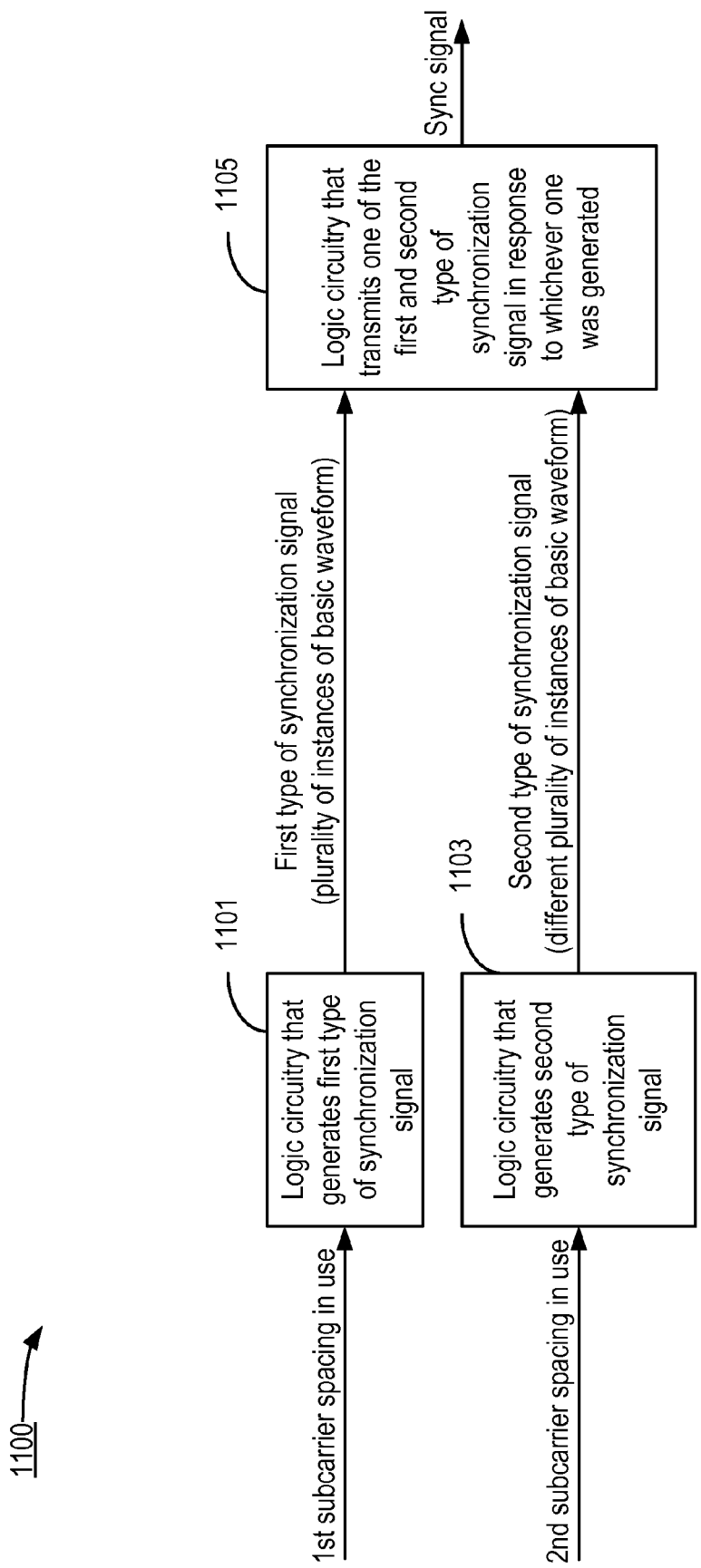
FIG. 11 depicts another exemplary embodiment of an apparatus 1100 for indicating which of a first subcarrier spacing and a second subcarrier spacing is presently in use in a cellular communication system.

FIG. 11 depicts another exemplary embodiment of an apparatus 1100 for indicating which of a first subcarrier spacing and a second subcarrier spacing is presently in use in a cellular communication system. The apparatus 1100 comprises logic circuitry 1101 configured to generate a first type of synchronization signal in response to the first subcarrier spacing presently being in use, and logic circuitry 1103 configured to generate a second type of synchronization signal in response to the second subcarrier spacing presently being in use. The apparatus 1100 also includes logic circuitry 1105 configured to transmit one of the first type of synchronization signal and the second type of synchronization signal in response to whichever of the first type of synchronization signal and the second type of synchronization signal was generated. Further in this exemplary embodiment, a time domain representation of the first type of synchronization signal includes a first plurality of instances of a basic waveform; a time domain representation of the second type of synchronization signal includes a second plurality of instances of the basic waveform; and the first plurality is not equal to the second plurality.

Figure 12:
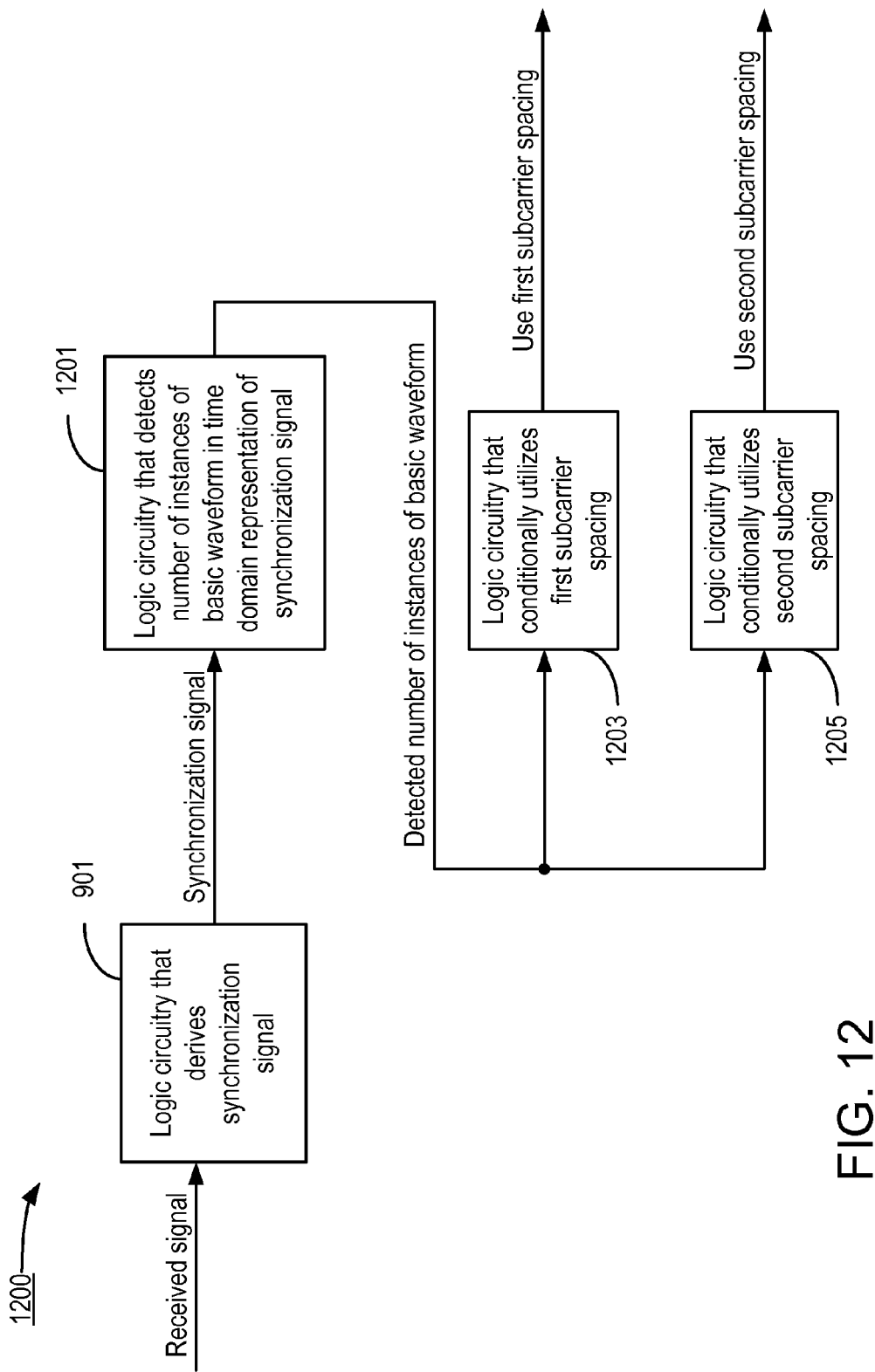
FIG. 12 depicts another exemplary embodiment of an apparatus 1200 for detecting which of a first subcarrier spacing and a second subcarrier spacing is presently in use in a cellular communication system.

FIG. 12 depicts another exemplary embodiment of an apparatus 1200 for detecting which of a first subcarrier spacing and a second subcarrier spacing is presently in use in a cellular communication system. The exemplary apparatus 1200 comprises logic circuitry 901 configured to process a received signal to derive therefrom a synchronization signal; logic circuitry 1201 configured to detect how many instances of a basic waveform are included in a time domain representation of the synchronization signal; logic circuitry 1203 configured to utilize the first subcarrier spacing in one or more subsequent communication operations if the time domain representation of the synchronization signal comprises a first plurality of instances of the basic waveform; and logic circuitry 1205 configured to utilize the second subcarrier spacing in one or more subsequent communication operations if the time domain representation of the synchronization signal comprises a second plurality of instances of the basic waveform, wherein the first plurality is not equal to the second plurality.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of indicating which of a first subcarrier spacing and a second subcarrier spacing is presently in use in a cellular communication system, the method comprising:
in response to the first subcarrier spacing presently being in use, generating a first type of synchronization signal;

in response to the second subcarrier spacing presently being in use, generating a second type of synchronization signal; and transmitting one of the first type of synchronization signal and the second type of synchronization signal in response to whichever of the first type of synchronization signal and the second type of synchronization signal was generated, wherein a time domain representation of the second type of synchronization signal includes a plurality of instances of the first type of synchronization signal.

2. The method of claim 1, wherein:
a radio interface of the cellular communication system utilizes Orthogonal Frequency Division Multiplexing (OFDM);

generating the first type of synchronization signal comprises mapping a set of synchronization symbols, $S_k$, ($0 \leq k \leq N-1$) onto a contiguous set of N subcarriers, each of the N subcarriers having the first subcarrier spacing; and generating the second type of synchronization signal comprises mapping the set of synchronization symbols, $S_k$, onto a set of n·N subcarriers (n>1) such that every $n^{th}$ one of the n·N carries one of the N synchronization symbols, and remaining ones of the n·N subcarriers carry zero values, wherein each of the n·N subcarriers has the second subcarrier spacing, wherein k, N, and n are integers.

3. The method of claim 2, wherein n=2.

4. The method of claim 1, wherein the time domain representation of the second type of synchronization signal consists of two instances of the first type of synchronization signal.

5. The method of claim 1, wherein:
the first subcarrier spacing is 15 kHz; and
the second subcarrier spacing is 7.5 kHz.

6. A method of detecting which of a first subcarrier spacing and a second subcarrier spacing is presently in use in a cellular communication system, the method comprising:

processing a received signal to derive therefrom a synchronization signal;

detecting whether a time domain representation of the synchronization signal comprises only one instance of a first type of synchronization signal; and if the time domain representation of the synchronization signal comprises only one instance of the first type of synchronization signal, then utilizing the first subcarrier spacing in one or more subsequent communication operations; and if the time domain representation of the synchronization signal comprises more than one instance of the first type of synchronization signal, then utilizing the second subcarrier spacing in one or more subsequent communication operations.

7. The method of claim 6, wherein detecting whether the time domain representation of the synchronization signal comprises only one instance of the first type of synchronization signal comprises:

generating correlation results by correlating the received signal against the first type of synchronization signal; and detecting whether the correlation results include distinct peaks separated in time by a predetermined amount.

8. The method of claim 6, wherein detecting whether the time domain representation of the synchronization signal comprises only one instance of the first type of synchronization signal comprises:

generating correlation results by correlating the received signal with a delayed copy of the received signal, wherein an amount of delay applied to generate the delayed copy of the received signal corresponds to a time period of first type of synchronization signal; and detecting whether the correlation results include a distinct peak.

9. The method of claim 6, wherein:
the first subcarrier spacing is 15 kHz; and
the second subcarrier spacing is 7.5 kHz.

10. An apparatus for indicating which of a first subcarrier spacing and a second subcarrier spacing is presently in use in a cellular communication system, the apparatus comprising:

logic circuitry that responds to the first subcarrier spacing presently being in use by generating a first type of synchronization signal;

logic circuitry that responds to the second subcarrier spacing presently being in use by generating a second type of synchronization signal; and logic circuitry that transmits one of the first type of synchronization signal and the second type of synchronization signal in response to whichever of the first type of synchronization signal and the second type of synchronization signal was generated, wherein a time domain representation of the second type of synchronization signal includes a plurality of instances of the first type of synchronization signal.

11. The apparatus of claim 10, wherein:
a radio interface of the cellular communication system utilizes Orthogonal Frequency Division Multiplexing (OFDM);

the logic circuitry that generates the first type of synchronization signal comprises logic circuitry that maps a set of synchronization symbols, $S_k$, ($0 \leq k \leq N-1$) onto a contiguous set of N subcarriers, each of the N subcarriers having the first subcarrier spacing; and the logic circuitry that generates the second type of synchronization signal comprises logic circuitry that maps the set of synchronization symbols, $S_k$, onto a set of n·N subcarriers (n>1) such that every $n^{th}$ one of the n·N carries one of the N synchronization symbols, and remaining ones of the n·N subcarriers carry zero values, wherein each of the n·N subcarriers has the second subcarrier spacing, wherein k, N, and n are integers.

12. The apparatus of claim 11, wherein n=2.

13. The apparatus of claim 10, wherein the time domain representation of the second type of synchronization signal consists of two instances of the first type of synchronization signal.

14. The apparatus of claim 10, wherein:
the first subcarrier spacing is 15 kHz; and
the second subcarrier spacing is 7.5 kHz.

15. An apparatus for detecting which of a first subcarrier spacing and a second subcarrier spacing is presently in use in a cellular communication system, the apparatus comprising:

logic circuitry that processes a received signal to derive therefrom a synchronization signal;

logic circuitry that detects whether a time domain representation of the synchronization signal comprises only one instance of a first type of synchronization signal; and logic circuitry that utilizes the first subcarrier spacing in one or more subsequent communication operations if the time domain representation of the synchronization signal comprises only one instance of the first type of synchronization signal; and logic circuitry that utilizes the second subcarrier spacing in one or more subsequent communication operations if the time domain representation of the synchronization signal comprises more than one instance of the first type of synchronization signal.

16. The apparatus of claim 15, wherein the logic circuitry that detects whether the time domain representation of the synchronization signal comprises only one instance of the first type of synchronization signal comprises:
 logic circuitry that generates correlation results by correlating the received signal against the first type of synchronization signal; and
 logic circuitry that detects whether the correlation results include distinct peaks separated in time by a predetermined amount.

17. The apparatus of claim 15, wherein the logic circuitry that detects whether the time domain representation of the synchronization signal comprises only one instance of the first type of synchronization signal comprises:
 logic circuitry that generates correlation results by correlating the received signal with a delayed copy of the received signal, wherein an amount of delay applied to generate the delayed copy of the received signal corresponds to a time period of first type of synchronization signal; and
 logic circuitry that detects whether the correlation results include a distinct peak.

18. The apparatus of claim 15, wherein:
 the first subcarrier spacing is 15 kHz; and
 the second subcarrier spacing is 7.5 kHz.

19. A method of indicating which of a first subcarrier spacing and a second subcarrier spacing is presently in use in a cellular communication system, the method comprising:
 in response to the first subcarrier spacing presently being in use, generating a first type of synchronization signal;
 in response to the second subcarrier spacing presently being in use, generating a second type of synchronization signal; and
 transmitting one of the first type of synchronization signal and the second type of synchronization signal in response to whichever of the first type of synchronization signal and the second type of synchronization signal was generated,
 wherein:
 a time domain representation of the first type of synchronization signal includes a first plurality of instances of a basic waveform;
 a time domain representation of the second type of synchronization signal includes a second plurality of instances of the basic waveform; and
 the first plurality is not equal to the second plurality.

20. An apparatus for indicating which of a first subcarrier spacing and a second subcarrier spacing is presently in use in a cellular communication system, the apparatus comprising:
 logic circuitry configured to generate a first type of synchronization signal in response to the first subcarrier spacing presently being in use;
 logic circuitry configured to generate a second type of synchronization signal in response to the second subcarrier spacing presently being in use; and
 logic circuitry configured to transmit one of the first type of synchronization signal and the second type of synchronization signal in response to whichever of the first type of synchronization signal and the second type of synchronization signal was generated,
 wherein:
 a time domain representation of the first type of synchronization signal includes a first plurality of instances of a basic waveform;
 a time domain representation of the second type of synchronization signal includes a second plurality of instances of the basic waveform; and
 the first plurality is not equal to the second plurality.

21. A method of detecting which of a first subcarrier spacing and a second subcarrier spacing is presently in use in a cellular communication system, the method comprising:
 processing a received signal to derive therefrom a synchronization signal;
 detecting how many instances of a basic waveform are included in a time domain representation of the synchronization signal; and
 if the time domain representation of the synchronization signal comprises a first plurality of instances of the basic waveform, then utilizing the first subcarrier spacing in one or more subsequent communication operations; and
 if the time domain representation of the synchronization signal comprises a second plurality of instances of the basic waveform, then utilizing the second subcarrier spacing in one or more subsequent communication operations,
 wherein the first plurality is not equal to the second plurality.

22. An apparatus for detecting which of a first subcarrier spacing and a second subcarrier spacing is presently in use in a cellular communication system, the apparatus comprising:
 logic circuitry configured to process a received signal to derive therefrom a synchronization signal;
 logic circuitry configured to detect how many instances of a basic waveform are included in a time domain representation of the synchronization signal; and
 logic circuitry configured to utilize the first subcarrier spacing in one or more subsequent communication operations if the time domain representation of the synchronization signal comprises a first plurality of instances of the basic waveform; and
 logic circuitry configured to utilize the second subcarrier spacing in one or more subsequent communication operations if the time domain representation of the synchronization signal comprises a second plurality of instances of the basic waveform,
 wherein the first plurality is not equal to the second plurality.

* * * * *